United States Patent [19]

Morales

[11] Patent Number: 4,954,032

[45] Date of Patent: Sep. 4, 1990

[54] ANTI-BACKLASH NUT

[75] Inventor: Victor H. Morales, Westbury, N.Y.

[73] Assignee: Windfred M. Berg, Inc., Brooklyn, N.Y.

[21] Appl. No.: 435,190

[22] Filed: Nov. 13, 1989

[51] Int. Cl.⁵ .......................... F16B 38/22; F16H 1/14
[52] U.S. Cl. .................................... 411/289; 411/433; 74/424.8 A
[58] Field of Search ........................ 411/231, 288-291, 411/433, 931; 74/424.8 A, 424.8 B, 424.8 VZ

[56] References Cited

U.S. PATENT DOCUMENTS

| | | | |
|---|---|---|---|
| 1,604,445 | 10/1926 | Hem | 411/231 |
| 1,737,543 | 11/1929 | Mason | 411/231 |
| 2,598,052 | 5/1952 | Hallock | 411/288 |

FOREIGN PATENT DOCUMENTS 209896  8/1940  Switzerland ..................... 411/231

*Primary Examiner*—Neill R. Wilson
*Attorney, Agent, or Firm*—Stoll, Previto & Hoffman

[57] ABSTRACT

An anti-backlash nut having a pair of nut segments, each with an internal threaded bore adapted to receive a threaded bolt. One nut segment has a portion insertable within the other nut segment and interlocking means are provided to lock the two nut segments together. A spiral spring acts on both nut segments to bias them away from each other. The interlocking means permits movement of the two nut segments away from each other to keep the threads of the bores of the two in contact with the threads of the bolt.

35 Claims, 2 Drawing Sheets

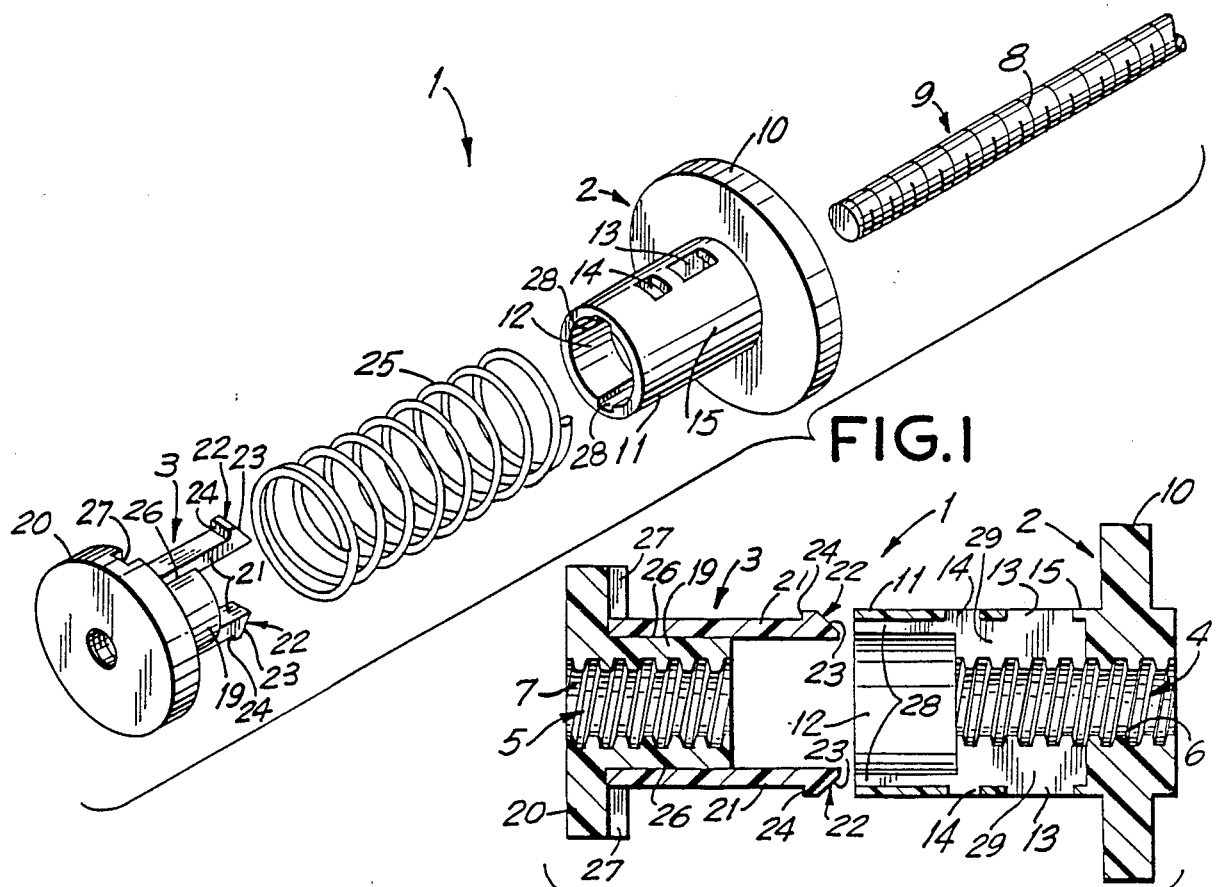
FIG.1
FIG.3
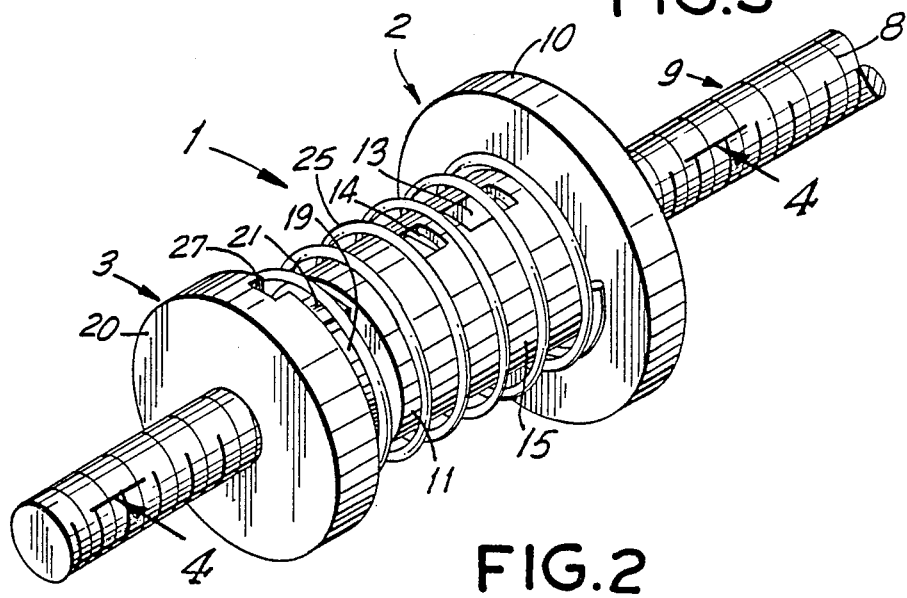
FIG.2

ANTI-BACKLASH NUT

BACKGROUND

This invention relates to an anti-backlash nut and more particularly to a linear positioning device where precise repeatability and accuracy is required. Specifically, the present invention encompasses elimination of backlash between a lead screw and mating nut through the use of a preload force applied by a spring through the nut mechanism.

Present devices reduce backlash at the expense of increasing the frictional drag within the assembly. Other devices use axial loading to bring portions of the nut into contact with portions of the screw thread face while another part of the nut contacts the opposite thread face to make up for variations in lead screw thread variations and system wear. Some previous available designs use torsional springs, a large number of component parts, and/or an axially split nut thread.

Illustrations of anti-backlash nut assemblies utilizing axially split nuts are illustrated in U.S. Pat. Nos. 4,131,031 and Re. 31,713. U.S. Pat. No. 2,690,682 illustrates another type of anti-backlash nut which utilizes a pin and socket to prevent rotational movement between a pair of nut segments.

BRIEF DESCRIPTION

The present invention provides an anti-backlash lead screw nut which eliminates the drawbacks of previous designs and makes use of the concept that minimizes frictional drag. Its assembly is simple, being made up of only a small number of component parts. The nut has the capability of snapping into a fixed assembled condition. Therefore, it does not have to be stored on its mating lead screw. When assembled the compression spring forces the forward part of the nut against the trailing face of the lead screw thread, and the rear portion of the nut against the leading face of the lead screw thread. The anti-backlash nut can be driven in either direction without any lost motion.

The present invention has for one of its objects an improved anti-backlash nut which is of simple construction, consisting of only two molded plastic nut parts and a captured compression spring which supplies the preload force.

Another object of the present invention is the provision of an improved anti-backlash nut in which assembly of the nut parts and spring is facilitated by built-in fingers. No tools are required for assembly nor are any external holding devices needed after assembly.

Another object of the present invention is the provision of an improved anti-backlash nut in which the parts are automatically locked in place upon assembly.

Another object of the present invention is the provision of an improved anti-backlash nut in which a relatively long axial compression spring gives essentially constant force through the small distance variations the assembly encounters because of lead screw thread pitch inaccuracies and wear.

Another object of the present invention is the provision of an improved anti-backlash nut in which the level of preload force may be tailored when using the anti-backlash lead screw assembly in a specific design by choosing a spring with the desired spring constant.

Another object of the present invention is the provision of an improved anti-backlash nut in which there exists room for adjustment of the nut which will allow additional spring compression to "fine tune" the desired preload.

Other and further objects of the invention will be obvious upon an understanding of the illustrative embodiment about to be described, or will be indicated in the appended claims and various advantages not referred to herein will occur to one skilled in the art upon employment of the invention in practice.

DESCRIPTION OF THE DRAWING

A preferred embodiment of the invention has been chosen for purposes of illustration and description and is shown in the accompanying drawings forming a part of the specification, wherein:

FIG. 1 is an exploded perspective view of the anti-backlash nut of the present invention.

FIG. 2 is a perspective view illustrating the assembled anti-backlash nut and the lead screw.

FIG. 3 is an exploded sectional view showing the nut segments of the present invention.

DESCRIPTION

Figure 4:
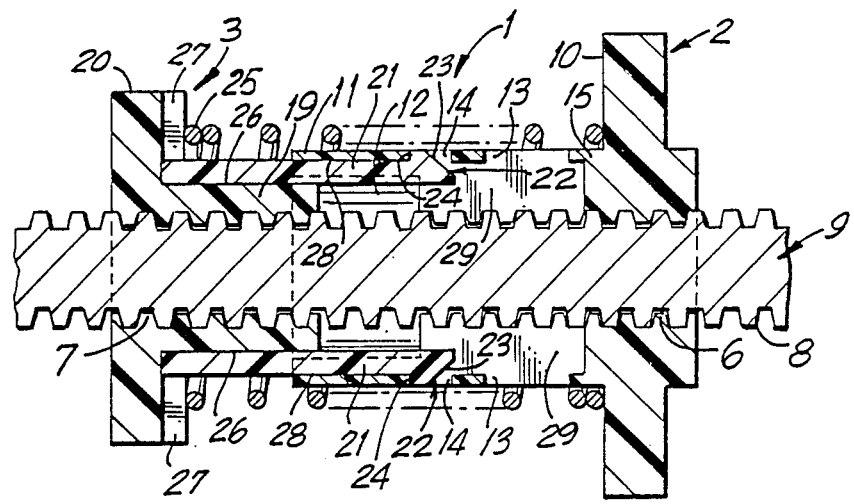
FIG. 4 is a sectional view taken along line 4—4 of FIG. 2.

Referring to the drawings, the anti-backlash nut 1 of the present invention, comprises a female nut segment 2 and male nut segment 3. Each nut segment 2 and 3 has a central bore or opening 4 and 5, respectively, each of which has internal threads 6 and 7, respectively, with the same pitch as the thread 8 on a bolt or other threaded member 9 to be inserted therewithin.

The female nut segment 2 has a main body portion 15 having a flange 10 extending upwardly therefrom at one end and at its other end has a hollow extension 11 with an unthreaded bore 12 which is of greater diameter than the threaded bore 4. The female nut segment 2 is provided with a plurality of adjustment openings or slots 13 and 14. Preferably, the adjustment slot 14 is located in the hollow extension 11 and the adjustment slot 13 is located in the body portion 15 of the female nut segment 2, although the location of adjustment slots 13-14 may be changed if desired.

Preferably, the adjustment slots 13-14 are elongated although they may assume other shapes. It will also be noted that the adjustment slots 14 are shorter than the adjustment slots 13 and that adjustment slots 13-14 are linearly spaced from, but coextensive with, each other. In the drawings, a pair of adjustment slots 13-14 is shown as being located diametrically opposed to each other around the periphery of the female nut segment 2. However, it will be understood that any number of adjustable slots 13-14 may be located around the periphery of the female nut segment 2 and that they need not be diametrically opposed to each other. In addition, it is within the scope of the present invention to use any number of coextensive adjustment slots rather than the pair 13-14 shown in the drawings.

The male nut segment 3 has a body portion 19 having an upstanding flange 20 extending upwardly from one end. The body portion 19 of the male nut segment 3 is insertable within the hollow extension 11 of the female nut segment 2. It will be noted that when the male nut 3 and the female nut 4 are in position, the inner threads 6 and 7 of both are coextensive with each other to accommodate the threaded bolt 9.

Extending from the other end of the body portion 19 of the male nut 3 are a plurality of guide prongs or fingers 21 each having a lock stop 22 thereon which are preferably located at the forward end of each guide finger 21. The guide fingers 21 are preferably resilient so that if they are flexed in one direction they will snap back to their original positions. The lock stops 22 of these guide fingers 21 are narrow enough to enter the adjustment slots 13-14. The peripheral positions of the guide fingers 21 and lock stops 22 around the body portion 19 of the male nut segment 3 are the same as the peripheral positions of the adjustment slots 13-14 around the body portion 15 of the female nut segment 2. The guide fingers 21 are of sufficient length so that the lock stops 22 enter the adjustment slots 13-14 when the male nut segment 3 is inserted into the female nut segment 2. The lock stops 22 are shown as being in the form of barbed hooks having inclined faces 23 and straight lock surfaces 24 to lock the guide fingers in place in the adjustment slots 13-14.

The adjustment slots 13-14 are of different lengths with the linear lengths of each being longer than the linear lengths of the lock stops 22. This permits the lock stops 22 to be inserted into either of the adjustment slots 13-14 and permits the lock stops 22 to move lengthwise within each of the adjustment slots 13-14. The difference in length in the adjustment slots 13-14 will permit a greater amount of flexibility in adjusting or fine tuning the range within which the compression spring 25 will exert a force moving the two nut segments 2-3 apart. If the lock stop 22 are in the shorter adjustment slots 14, the range within which movement of the nut segments possible will be less than the range of movement when the lock stops 22 are in the longer adjustment slots 13. The anti-backlash nut of the present invention permits the flexibility needed in order to use the same nut for a wide variety of situations.

Preferably, the guide fingers 21 are shown in the drawings as being separate elements mounted in elongated retaining grooves 26 in the body portion 19 of male nut segment 3 and anchored at their rear in a slot 27 in the flange 20. This will hold the guide fingers 21 in place and prevent them from being misaligned. In addition, elongated guide grooves 28 and 29 are preferably provided in the bores 12 and 4 of the extension 11 and body portion 15, respectively, of the female nut segment 3. These elongated guide grooves communicate with the adjustment slots 13 and 14 in order to positively direct the guide fingers 21 and lock stops 22 to the lock slots 13-14 and prevent angular movement between two nut segments 2 and 3 when they are being assembled.

When the lock stops 22 are snapped into either of the adjustment slots 13-14, the nut segments 2-3 are locked together. The lock stops 22 protrude through the adjustment slots 13-14 and are captured therewithin so that the nut segments 2-3 cannot move rotationally in relation to each other and cannot become disassembled from each other when the anti-backlash nut is in use. With the parts in this position the threaded bolt 9 may be removed without the nut segments 2-3 becoming disassembled. Hence, the anti-backlash nut may be stored or shipped in its assembled condition without the threaded number 9. In order to disassemble the two nut segments 2-3 from each other, the protruding lock stops 22 must be depressed inwardly until they clear the inner edges of the walls of adjustment slots 13-14. This will free the lock stops 22 from the constraints of the adjustment slots 13-14 and permit the two nut segments 2-3 to be disassembled. The same procedure is followed when it is desired to remove the lock stops 22 from one of the adjustment slots 13-14 and place them in another.

A spiral compression spring 25 is loosely positioned around both nut segments 2 and 3 and applies an outward force against the flanges 10 and 20 extending from each which biases and moves the two nut segments 2 and 3 apart and away from each other.

Figure 7:
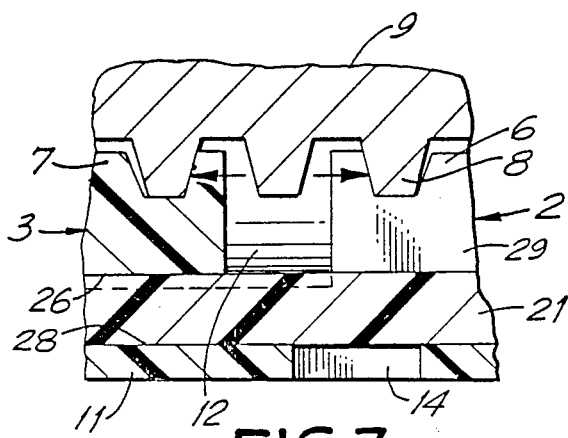
FIG. 7 is a fragmentary sectional view of the anti-backlash nut and lead screw assembly illustrating the action of the compression spring applying an axial force to push apart the two nut segments.

In operation, the male nut segment 3 is inserted into the female nut segment 2 by moving the guide fingers 21 along the guide grooves 28-29 until the lock stops 22 snap into the openings 14 (for example), at which time the two nut segments 2 and 3 are held together against relative angular movement. The force of a spring 25 holds them apart by bearing against flanges 10-20. When the threaded member 9 is threaded into both nut segments 2-3, the parts will assume the positions shown in FIGS. 2 and 4. If there is any wear or any other discrepancy between the threads 6-7 of the nut segments 2-3 and the thread 8 of the bolt 9, the spring 25 will allow the two segments to move apart relative to each other so that threads 6-7 of the nut segments 2-3 bear against the threads of the bolt 9. When assembled the compression spring 25 forces the forward part of the threads 6 of nut segment 3 against the trailing face of the lead screw thread 8 and the rear portion of the threads 7 nut segment 2 against the leading face of the lead screw thread 8. This action is illustrated in FIG. 7 and although FIG. 7 shows the lock stops 22 in the longer adjustment slots 13 (FIG. 5), the action is the same whether the lock stops 22 are in longer adjustment slots 13 (FIG. 5) or in shorter adjustment slots 14 (FIG. 4).

Figure 5:
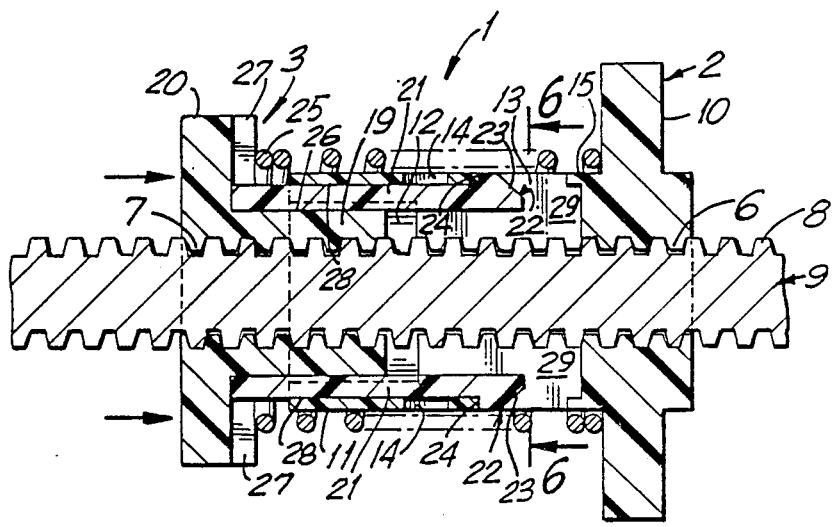
FIG. 5 is a sectional view similar to FIG. 4 showing the position of the anti-backlash nut of the present invention in a different position.
Figure 6:
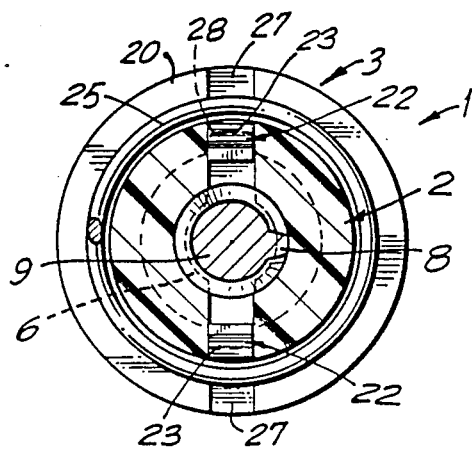
FIG. 6 is a sectional view taken along line 6—6 of FIG. 5.

In the position of the parts shown in FIG. 4 with the lockstops 22 in the shorter adjustment slots 14, the two nut segments 2-3 can be fine tuned or adjusted, i.e., moved toward or away from each other to accommodate for wear or other discrepancies in the threads. However, if a greater amount of fine tuning or adjustment is considered desirable or necessary, the lock stops 22 can be inserted into the longer adjustment slots 13 as shown in FIG. 5 to 7. In this position, a greater amount of fine tuning or adjustment can be exerted on the two nut segments 2-3 since the space within which the lock stops 22 move in adjustment slots 13 is greater.

With this construction, whenever the threads 6, 7 and 8 wear or there is any other discrepancy between the threads of threaded bolt 9 and the inner threads 6-7 of the nut segments 2 and 3, the spring 25 moves the nut segments 2 and 3 apart and the threads 6, 7 and 8 remain in contact to compensate for the wear. Hence, there is always a positive engagement between the nut segments 2 and 3 and the bolt 9.

With this structure, frictional drag is reduced to a minimum. Being made up of only three parts, the anti-backlash nut of the present invention has the capability of being snapped into a fixed assembled condition and will remain in that position so that it can be stored separate from its mating lead screw. The anti-backlash nut of the present invention can be easily driven in either direction without any lost motion whatsoever. The present invention provides an improved anti-backlash nut which is of simple construction which is easily assembled by the use of built-in guide fingers without the necessity of tools nor the necessity for any external holding devices to hold the parts together after assembly.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. An anti-backlash nut comprising at least two nut segments, each nut segment having an internal threaded bore adapted to receive a threaded member therein, one nut segment having at least a portion thereof insertable within the other nut segment, means for interlocking the nut segments together, said interlocking means comprising resilient lock means on one nut segment and means on the other nut segment for removably receiving the resilient lock means and resilient means acting on said nut segments to exert pressure on the nut segments to permit them to move linearly relative to each other.

2. An anti-backlash nut as set forth in claim 1 wherein said resilient means exerts pressure to move the two nut segments apart.

3. An anti-backlash nut as set forth in claim 2 wherein one of said nut segments is a female nut segment and the other of said nut segments is a male nut segment insertable therewithin.

4. An anti-backlash nut as set forth in claim 3 wherein said receiving means comprises at least one slot and resilient locking means interrengaging with said slot to hold the segments together.

5. An anti-backlash nut as set forth in claim 4 wherein said slot is an adjustment slot.

6. An anti-backlash nut as set forth in claim 5 wherein said adjustment slot is in the female portion and said locking means are in the male portion.

7. An anti-backlash nut as set forth in claim 6 wherein said locking means comprise a guide finger mounted on said male nut segment.

8. An anti-backlash nut as set forth in claim 7 wherein said adjustment slot is in the female nut segment and adapted to receive the guide finger.

9. An anti-backlash nut as set forth in claim 8 wherein said finger has a lock stop insertable in said adjustment slot.

10. An anti-backlash nut as set forth in claim 9 wherein the lock stop is linearly shorter than the adjustment slot to permit linear movement of the lock stop within the adjustment slot.

11. An anti-backlash nut as set forth in claim 10 wherein a plurality of guide fingers are provided on the female nut segment and a plurality of adjustment slots are provided on the male nut segment, at least some of which are adapted to cooperate with at least one of the guide fingers.

12. An anti-backlash nut as set forth in claim 11 wherein a plurality of linearly oriented adjustment slots are provided in the female nut segment co-extensive with each other, each of the adjustment slots being capable of receiving a lock finger.

13. An anti-backlash nut as set forth in claim 12 wherein at least one of the linearly oriented adjustment slots is longer than the other linearly oriented adjustment slots.

14. An anti-backlash nut as set forth in claim 13 wherein said plurality of guide fingers and adjustment slots are diametrically opposed to each other.

15. An anti-backlash nut as set forth in claim 14 wherein a pair of linearly oriented adjustment slots is provided, one of which is longer than the other.

16. An anti-backlash nut as set forth in claim 15 wherein guideways are provided in the female nut segment to direct the guide fingers into the said adjustment slots.

17. An anti-backlash nut as set forth in claim 16 wherein the guide fingers are resilient.

18. An anti-backlash nut as set forth in claim 17 wherein said guide fingers are mounted in retaining grooves in the male nut segment.

19. An anti-backlash nut as set forth in claim 18 wherein said lock stops comprise inclined faces and lock surfaces.

20. An anti-backlash nut as set forth in claim 19 wherein each nut segment has an upstanding flange and wherein the resilient means are interposed between said flanges.

21. An anti-backlash nut as set forth in claim 20 wherein said resilient means is a special spring surrounding the two nut segments.

22. A nut segment for an anti-backlash nut, said nut segment having an internal threaded bore adapted to receive a threaded member therein, said nut segment having at least one adjustment slot therein.

23. A nut segment as set forth in claim 22 wherein a plurality of adjustment slots are provided on the nut segment.

24. A nut segment as set forth in claim 23 wherein a plurality of linearly oriented adjustment slots are provided in the nut segment co-extensive with each other.

25. A nut segment as set forth in claim 24 wherein one of the linearly oriented adjustment slots is longer than the other linearly oriented adjustment slots.

26. A nut segment as set forth in claim 25 wherein said plurality of adjustment slots are diametrically opposed to each other.

27. A nut segment as set forth in claim 26 wherein a pair of linearly oriented adjustment slots is provided, one of which is longer than the other.

28. A nut segment as set forth in claim 27 wherein guideways are provided in the nut segment which lead to the said adjustment slots.

29. A nut segment for a anti-backlash nut, said nut segment having an internal threaded bore adapted to receive a threaded member therein, said nut segment having a locking guide finger thereon.

30. A nut segment as set forth in claim 29 wherein said guide finger has a lock stop thereon.

31. A nut segment as set forth in claim 30 wherein a plurality of guide fingers are provided thereon.

32. A nut segment as set forth in claim 31 wherein said plurality of guide fingers are diametrically opposed to each other.

33. A nut segment as set forth in claim 32 wherein the guide fingers are resilient.

34. A nut segment as set forth in claim 33 wherein said guide fingers are mounted in retaining grooves.

35. A nut segment as set forth in claim 34 wherein said lock stops comprise inclined faces and lock surfaces.

* * * * *